United States Patent [19]

Harashima

[11] Patent Number: 5,540,099
[45] Date of Patent: Jul. 30, 1996

[54] VIBRATION DETECTING DEVICE AND VEHICULAR ROAD SIMULATOR EMPLOYING THE DEVICE

[75] Inventor: Shokichi Harashima, Saitama, Japan

[73] Assignee: Honda Giken Kogyo Kabushiki Kaisha, Tokyo, Japan

[21] Appl. No.: 341,900

[22] Filed: Nov. 15, 1994

[30] Foreign Application Priority Data

Nov. 15, 1993 [JP] Japan .................. 5-284661

[51] Int. Cl.⁶ .............................. G01M 7/02; G01M 17/00
[52] U.S. Cl. ............................................................ 73/669
[58] Field of Search ...................................... 73/669, 503

[56] References Cited

U.S. PATENT DOCUMENTS 4,085,363  4/1978  Gravina et al. ................. 73/503
4,317,105  2/1982  Sinha et al. .................... 73/503

FOREIGN PATENT DOCUMENTS 498648  8/1992  European Pat. Off. .......... 73/669

*Primary Examiner*—John E. Chapman
*Attorney, Agent, or Firm*—Birch, Stewart, Kolasch & Birch, LLP

[57] ABSTRACT

A vibration detecting device is provided for detecting a vibration applied to a vehicle, which includes an accelerometer mounted on the vehicle, an inverting amplifier for inverting and amplifying the output from the acceleration detecting device, and an integrator for integrating the output from the inverting amplifier. The output from the accelerometer is converted into a vibration detecting output by the integrator.

9 Claims, 5 Drawing Sheets

VIBRATION DETECTING DEVICE AND VEHICULAR ROAD SIMULATOR EMPLOYING THE DEVICE

BACKGROUND OF THE INVENTION

1. Field of the Invention

The present invention relates to a vibration detecting device used for detecting a vibration applied to a vehicle, and a vehicular road simulator employing the vibration detecting device.

2. Description of Background Art

There has been developed a vehicular road simulator for performing a vibration test on a vehicle without actually driving the vehicle by the steps of actually running a vehicle such as a motorcycle, an automatic four-wheeled vehicle or the like; collecting the vibration waveform applied to the vehicle as an actual vibration waveform data; and applying, on the basis of the collected actual vibration waveform data, the same vibration as that applied to the actual traveling vehicle to the vehicle mounted on a testing base by a hydraulic actuator.

A vehicle vibration test is performed as follows: First, a vibration applied to a vehicle traveling along a road surface is detected by an accelerometer, and the detected acceleration is recorded in a data recorder. In the road simulation by a vehicle simulator, on the basis of the vibration data thus collected, a vibration is applied to the vehicle mounted on a testing base by way of the axle shaft or wheels of the vehicle by an actuator. As for the activation by the actuator in this vehicle vibration test, a transfer function of a system including the actuator, vehicle and accelerometer is obtained by repeating trial activation; an activation control signal is obtained on the basis of the transfer function and the collected actual vibration waveform; and the same vibration as that applied to the actually traveling vehicle is applied to the vehicle by the actuator while controlling the activation on the basis of the activation control signal. In addition, at the times of both the actual running and the simulation testing activation, the same accelerometer is used.

In the above-described load simulation by the vehicle road simulator, the reproduction of a vertical vibration applied to a traveling vehicle is generally performed by recording the acceleration of the traveling vehicle by an accelerometer attached near the axle shaft of the vehicle, and applying, to the vehicle mounted on a testing base, the same vibration as that with the vibration waveform thus recorded.

On the other hand, it may be considered that a linear voltage differential transformer (LVDT) or a velocity meter is used for detecting the vibration of a vehicle. However, it has a structure of two parts, that is, a coil section and core section, and is not easy to be mounted on the vehicle. Accordingly, it is not used for detecting the vibration of a vehicle. An optical displacement meter has a structure of one part, but is low in the sensitivity for a vibration with high frequency. Accordingly, it is not used for detecting the vibration of a vehicle. In contrast, an accelerometer is suitable for detecting the vibration of a vehicle, because it is compact and lightweight, and further it has an integrated structure and is simply mounted on a vehicle.

For the above-described reason, the accelerometer is used for detecting the vibration of a vehicle in the vehicle road simulator, and the acceleration applied to a vehicle is detected by the accelerometer, and is collected. However, in the detection of the acceleration applied to a vehicle, the accelerometer is required to withstand accelerations having an upper limit frequency of 100 Hz or more and an acceleration level of 50 (G) or more.

However, an accelerometer capable of withstanding accelerations having an upper limit frequency of 100 Hz or more and an acceleration level of 50 (G) or more has a disadvantage that it is low in the sensitivity for vibrations having low frequencies. Thus, it is difficult to reproduce frequency components of 2 to 3 Hz or less in a vehicle load simulator upon test activation. This is true, in particular, for a motorcycle, which has a longer suspension than that of an automatic four-wheeled vehicle. Accordingly, a vehicle load simulator for a motorcycle requires the detection of low frequency components of vibration. Even an automatic four-wheeled vehicle has main frequencies of rolling or pitching of the body in the range from 1 to 2 Hz. Accordingly, a vehicle road simulator for an automatic four wheeled vehicle also requires the detection of low frequency components of vibration.

In the detection of vibrations of a vehicle, there is an inconvenience in that an acceleration detecting device selected for detecting the maximum acceleration cannot detect low frequency components of vibration. To cope with this inconvenience, as exemplified in unexamined Japanese Patent Publication No. Hei-3-295437, an accelerometer having a good sensitivity for low frequency components of vibration is provided in addition to an accelerometer suitable for the detection of the maximum acceleration. In this case, for example, the accelerometer suitable for low frequency components of vibration is mounted on a measurement portion of the body where low frequency components of vibration are generated. Thus, there is a disadvantage in preparing two kinds of accelerometers.

Moreover, an accelerometer having a good sensitivity for low frequency components of vibration is expensive, and requires careful handling because it is sensitive to shock and easily broken. In the case of traveling along a rough pavement to gather data for a road simulation by a vehicle load simulator and of testing the activation of such a simulator, an accelerometer for detecting low frequency components of vibration cannot withstand accelerations exceeding an allowable value and thus is often broken. Accordingly, an accelerometer having good sensitivity for low frequency components of vibration is difficult to be practically used in a vehicle load simulation.

Moreover, in the case of detecting the acceleration by use of two kinds of accelerometers mounted on a vehicle load simulator, there occurs a disadvantage in that the provision of the two accelerometers is accompanied by an increase in the number of amplifiers for amplifying the output of the accelerometers and the channels of the collecting devices for collecting acceleration data.

Additionally, the provision of two accelerometers has the following disadvantages. In the case of conversion into digital data, there is an increase in the number of A/D converters, D/A converters for driving an actuator, correcting circuits for correcting the D/A conversion output on the basis of a transfer function, and the like. Moreover, in the case where the correction on the basis of a transfer function is required to be performed by a computer, the road on calculation and the data area are increased linearly with the number of channels, thereby deteriorating the response of a computer control system. Further, the programming becomes complex.

OBJECTS AND SUMMARY OF THE INVENTION

An object of the present invention is to provide a single vibration detecting device capable of withstanding the required maximum acceleration and of detecting a wide range of frequency components of vibration of a vehicle traveling on an irregular surface, and a vehicle load simulator using the vibration detecting device.

According to the present invention, there is provided a vibration detecting device for detecting a vibration applied to a vehicle which includes an accelerometer mounted on the vehicle, and an integrator for integrating an output from the accelerometer wherein the output from the accelerometer is converted into a vibration detecting output by the integrator.

The vibration detecting device may include an inverting amplifier for inverting the output from the accelerometer and supplying the inverted output to the integrator.

Moreover, according to the present invention, there is provided a vehicular road simulator, characterized in that the simulator reproduces a vibration applied to a vehicle mounting the accelerometer of the vibration detecting device of the present invention.

In the vibration detecting device of the present invention, the acceleration applied to a vehicle is detected by an accelerometer. The output from the accelerometer is integrated by an integrator to be converted, into a velocity signal, and is output. Since the detected acceleration output is converted into a velocity output, low frequencies of vibration are easily detected compared with the case using the detected acceleration signal. This makes it possible to detect a wide range of frequencies of vibration by only one accelerometer.

When the output from the accelerometer is inverted by an inverting amplifier and is supplied to the integrator, even if the integrator is constituted of an inverting operational amplifier, the polarity of the output from the integrator is made to correspond to the polarity of the detected acceleration output.

In the vehicle load simulator using the vibration detecting device of the present invention, the number of velocity detecting devices are reduced and the number of channels for the detected velocity output is reduced. In the case of conversion into digital data, there is not an increase in the number of A/D converters, D/A converters for driving an actuator, correcting circuits for correcting the D/A conversion output on the basis of a transfer function, and the like. Moreover, in the case where the correction on the basis of a transfer function is performed by a computer, the load on the calculation and the data area are not increased linearly with the number of channels thereby preventing the deterioration of the response of a computer control system, and further the program is prevented from becoming complex.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

Hereinafter, the present invention will be described by way of embodiments.

Figure 1:
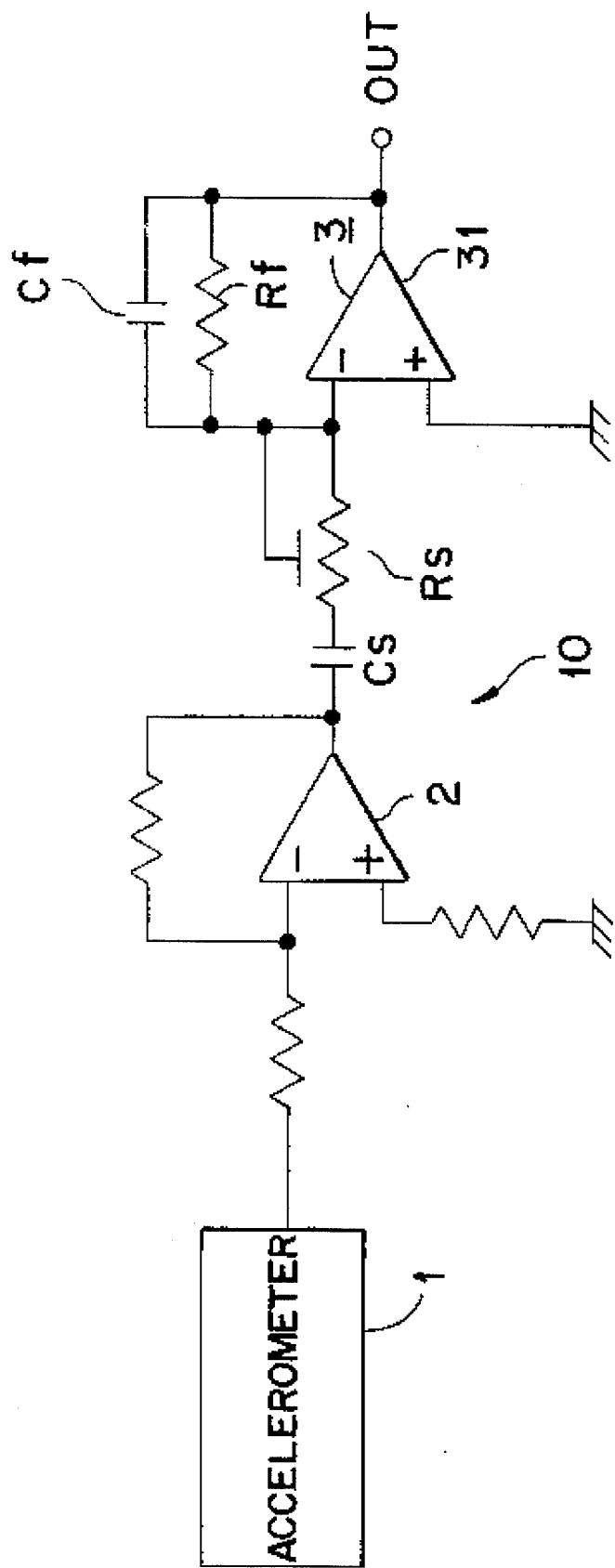
FIG. 1 illustrates a block diagram showing one embodiment of a vibration detecting device of the present invention.

FIG. 1 is a block diagram showing the construction of one embodiment of a vibration detecting device of the present invention.

In FIG. 1, the vibration detecting device 10 includes an accelerometer 1, an inverting amplifier 2 with a gain "1" for inverting and amplifying the output from the accelerometer 1, and an integrator 3 for integrating the amplified output from the inverting amplifier 2. The output from the integrator 3 is taken as the vibration detecting output. An operational amplifier 31 constitutes a portion of the integrator 3. The reason why the inverting amplifier 2 is provided on the inverting input side of the integrator 3 is that the operational amplifier 31 thereby has an output polarity which is the same sign as the output polarity of the accelerometer 1.

Figure 2:
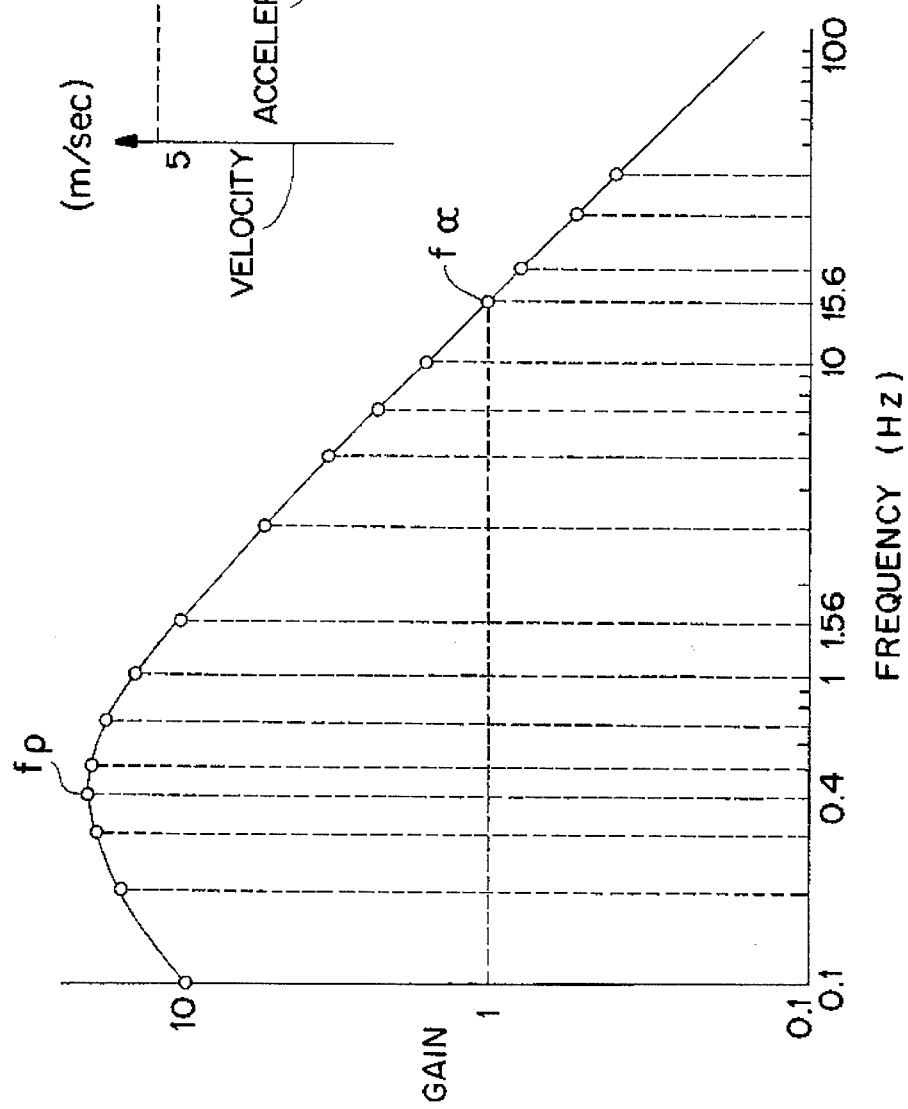
FIG. 2 illustrates a graph showing the frequency-gain characteristic of an integrator in the embodiment of the present invention.

The frequency-gain characteristic of the integrator 3 in this embodiment is shown in FIG. 2. The above characteristics are measured using the accelerometer 1 for generating an output of 10 V at an acceleration level of 50 (G), an input side resistance Rs of about 10.4 kΩ, a feedback resistance Rf of 270 kΩ, an input capacitor Cs of 47 μF, and a feedback capacitor Cf of 1 μF.

In FIG. 2, the gain is decreased at 6 dB/oct (20 dB/dec) as the frequency is increased from the specified frequency $f_p$=0.7 Hz. The frequency $f_\alpha$ corresponding to the gain "1" is specified at the value of $[1/(2\pi \cdot t_f \cdot R_s)]$. In this case, by calculation and by actual measurement, the gain "1" is obtained at a frequency of about 15.6 Hz, and the gain "0.1" is obtained at a frequency of about 156 Hz. The frequency range shown by this straight line portion sufficiently covers the frequency range of vibration used in the vehicle load simulator.

Letting <a> be an amplitude, and a displacement <x> be a sine-wave (a sin ωt), the velocity is expressed by (a ω cos ωt), and the acceleration is expressed by ($-a \omega^2$ sin ωt); and the maximum value of the velocity is expressed by [ω(m/sec)=2πfa], and the maximum value of the acceleration is expressed by [$a\omega^2$(m/sec$^2$)=$4\pi^2 f^2 a$/9.8 (G)]. The vibration applied to a vehicle traveling along a rough pavement is known to have an acceleration of 50 (G) and a frequency ranging from 15 to 40 Hz.

When the acceleration is 50 (G) and the frequency is in the range from 14 to 40 Hz, the amplitude <a> is in the range of 18 mm≦a≦50 mm. When the frequency is 40 Hz and the amplitude <a> is 18 mm, the velocity is about 4.5 (m/sec). On the other hand, when the frequency is 15 Hz and the amplitude <a> is 50 mm, the velocity is about 4.7 (m/sec). The acceleration of 50 (G) is thus made to correspond to the velocity of 5 (m/sec). Accordingly, when the maximum acceleration is taken as 50 (G), it is converted into the maximum velocity of 5 (m/sec).

Figure 3:
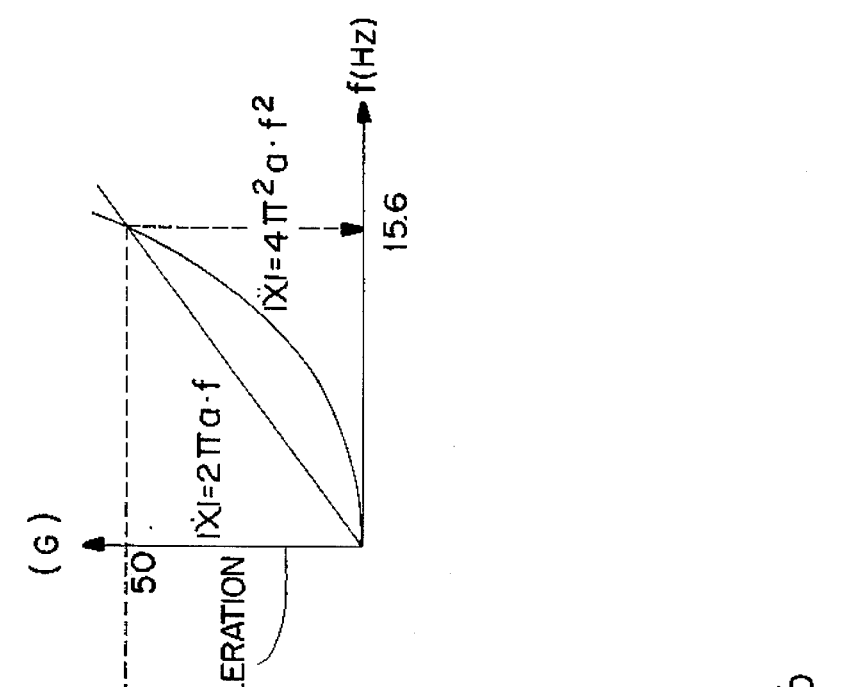
FIG. 3 illustrates a graph showing the frequency-velocity, acceleration characteristic in the embodiment of the present invention.

FIG. 3 shows the relationship between the frequency, velocity and acceleration, wherein the acceleration of 50 (G) is made to correspond to the velocity of 5 (m/sec) and the amplitude is made constant. As is apparent from FIG. 3, the frequency of vibration at the time when the velocity is in conformity with the acceleration is about 15.6 Hz.

Accordingly, when the frequency is 15.6 Hz and the acceleration is 50 (G), the accelerometer 1 may supply 100% of the output, and also the integrator 3 may supply 100% of the output, that is, the gain of the integrator 3 may be set to "1" at the frequency of 15.6 Hz. Namely, at the vibration with a frequency of 15.6 Hz, when the accelerometer 1 detects the acceleration of 50 (G), it supplies 100% of the output. The integrator 3 receives 100% of the output from the accelerometer 1 and supplies 100% of the output. This is realized by a method wherein the input resistance Rs and the capacitance of the feedback capacity Cf are set at 10.4 KΩ and 1 μF, respectively, thus obtaining the frequency-gain characteristic of the integrator 3 shown in FIG. 2.

The acceleration and the velocity corresponding to the vibration with a frequency of 1 Hz and an amplitude of 10 mm are about 0.04 (G) [=(4π2.12.10)/(1000.9.8)] and about 0.063 (m/sec) [2π.1.10/1000], respectively. In the accelerometer 1 of a type in which the input/output characteristic is linear and 100% of the output is generated for an acceleration of 50 (G), the output for a vibration with a frequency of 1 Hz and an amplitude of 10 mm, that is, the acceleration of about 0.04 (G) becomes 0.08% of the full scale, which is very small.

However, the integrator 3 receives the output (=100% output) from the accelerometer 1 for the acceleration of 50 (G), and outputs the full scale (=100%) value, that is, the velocity of 5 m/sec. Here, a vibration with a frequency of 1 Hz and an amplitude of 10 mm, that is, an acceleration of 0.04 (G) corresponds to a velocity of 0.063 m/sec. The output of the integrator 3 for 0.063 m/sec becomes 1.26% of the full scale. Accordingly, as compared with the output to the full scale in the accelerometer 1, the ratio of the output to the full scale in the integrator 3 becomes 1.26% versus 0.08%, that is, it is increased by about 16 times.

As shown in FIG. 3, since the output of the accelerometer 1 is integrated by the integrator 3 and is fetched, the change in the output level of the integrator to the change in the unit frequency is increased on the side of low frequencies of vibration, while it becomes smaller on the side of high frequencies of vibration.

For example, near the frequency of 100 Hz, the output from the integrator 3 becomes about 0.16 m/sec. Accordingly, the ratio of the output to the full scale in the integrator 3 as compared with that in the acceleration detecting device 1 becomes 1/6.4. This does not deteriorate the reproduction in the vehicle load simulator because an acceleration signal in a high frequency area is large.

As is known from many results of measuring a road surface, for running surface irregularities high in spatial frequencies, i.e. lower pitch, the amplitude becomes smaller. For example, for a surface with irregular components having a spatial frequency increased by about 100 times, the amplitude decreases by about a factor of 1/100. Table 1 shows the ratio of the acceleration output to the full scale versus the ratio of the velocity output to the full scale, wherein the acceleration is 100%=50 (G), the velocity is 100%=5 m/sec, the frequency and amplitude of vibration caused by surface irregularities of the road surface are 1 Hz and ±10 mm or 100 Hz and ±0.1 mm.

TABLE 1

| road condition | 1 Hz, ±10 mm | 100 Hz, ±0.1 mm |
| --- | --- | --- |
| ratio of acceleration output to full scale (100% = 50 G) | 0.04% | 8% |
| ratio of velocity output to full scale (100% = 5 m/sec) | 1.26% | 1.4% |

As is apparent from Table 1, the acceleration output to the full scale becomes 0.04% and 8% at the vibration components (1 Hz, ±10 mm) and (100 Hz, ±0.1 mm), respectively. At the latter vibration component, the output to the full scale is large and can be sufficiently measured. On the contrary, at the former vibration component, the output to the full scale is very small and is difficult to be measured.

On the other hand, the velocity output to the full scale becomes 1.26% and 1.4% at the vibration components (1 Hz, ±10 mm) and (100 Hz, ±0.1 mm), respectively. At the latter vibration component, the ratio of the output to the full scale is small compared with the case of the acceleration output. However, the output is sufficient to be measured. On the contrary, at the former vibration component, the ratio of the output to the full scale is large compared with the case of the acceleration output. Therefore, for both the vibration components, it is desirable to convert the acceleration output into the velocity output.

Another embodiment of a vehicle load simulator will be described using the vibration detecting device of the present invention.

Figure 4:
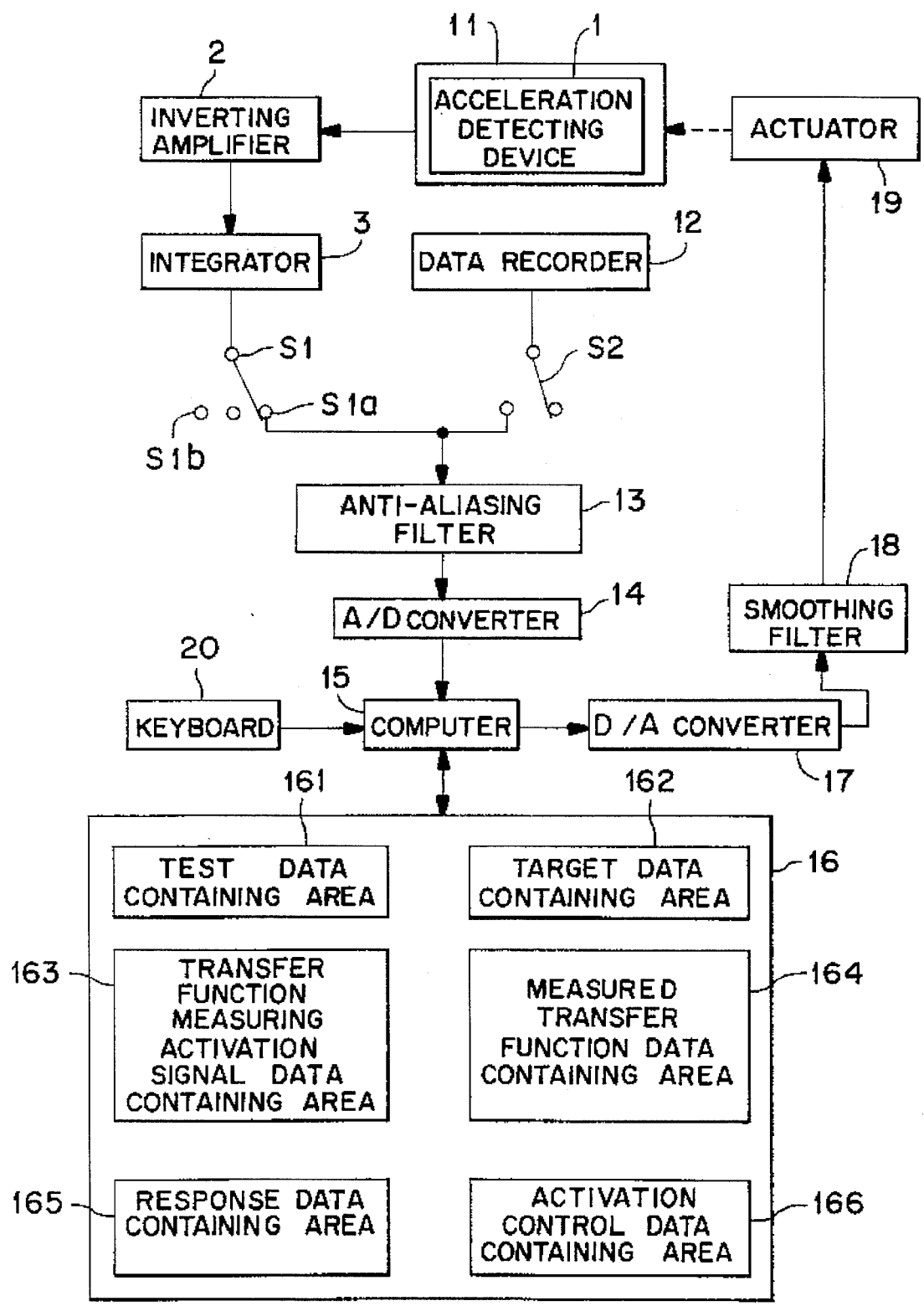
FIG. 4 illustrates a block diagram showing the construction of a vehicle load simulator of the present invention.

FIG. 4 is a block diagram showing one embodiment of the vehicle load simulator of the present invention. As is shown in FIG. 4, the output from an accelerometer 1 is supplied to an integrator 3 by way of an inverting amplifier 2. The output from the integrator 3 is supplied to a data recorder 12 composed of a magnetic recording reproducing device by way of a contact S1a of a switch S1 having an open position and a switch S2. Thus, the output from the integrator 3, that is, the acceleration data converted into the velocity data is recorded in the data recorder 12.

The output from the integrator 3 is supplied to an antialiasing filter 13 by way of a contact S1b of the switch S1 for preventing return noise to be restricted in its Nyquist frequency band. The output from the anti-aliasing filter 13 is input in an A/D converter 14 to be converted into digital data. Similarly, the output of the integrator 3 read from the data recorder 12 is supplied to the A/D converter 14 by way of the switch S2 and the anti-aliasing filter 13, so that it is restricted in its frequency band and is converted into digital data.

The digital data converted by the A/D converter 14 is supplied to a computer 15, and is contained in a memory 16 while being controlled by the computer 15 on the basis of a command from an indicating key provided on a key board 20. The digital data, activation control data or the like, read from the memory 16 are supplied to a D/A converter 17, to be converted into analog signals. The analog signals are supplied to an actuator 19 by way of a smoothing filter 18 and controls the activation by the actuator 19.

On the other hand, the memory 16 includes a test data containing area 161 for containing data from the integrator 3 during running of the test, a target data containing area 162, a transfer function measuring activation signal data containing area 163, a measured transfer function data containing area 164, a response data containing area 165, and an activation control data containing area 166.

The output of the acceleration of a vehicle running along a road surface is detected by the accelerometer 1. The output from the accelerometer 1 is input into the integrator 3 by way of an inverting amplifier 2. In such a state, the switch 1 is set to be turned on the contact S1a side, and the switch S2 is set to be closed. Accordingly, the output from the integrator 3 is recorded in a magnetic tape of the data recorder 12.

Next, the switch S1 is set to be open, and the switch S2 is set to be left closed. In such a state, the data recorded in the magnetic tape of the data recorder 12 are read out and are output as analog signals. The analog signals are restricted in the frequency bands by the anti-aliasing filter 13, and are converted into digital data by the A/D converter 14. In this case, since the signals are restricted in the frequency bands, there is not generated any return noise. The A/D converted digital data are contained in the running data containing area 161 by the computer 15.

The data contained in the test data containing area 161 are subjected to pre-treatment for erasing unnecessary portions of data and unnecessary portions of frequency components, and are transmitted and contained into the target data containing area 162 as target data. The data contained in the test data containing area 161 may be transmitted into an operating area in the memory 16 to be processed, and contained in the test data containing area 161 again. In this way, the test data containing area 161 can serve as the target data containing area.

After the above processing is completed, the vehicle road simulation is started. An automatic four-wheeled vehicle 11 is to be activated.

In such a state, the vehicle to be road-simulated is mounted on a testing base, and the switch S1 is set to be turned on the contact S1b side, and the switch S2 is set to open.

Next, activation signal data for measuring a transfer function, for example, burst signal data such as white noise are read from the transfer function measuring activation signal data containing area 163, and are converted into analog signals by the D/A converter 17. The analog signals are smoothed by the smoothing filter 18 and are supplied to the actuator 19. Thus, the vehicle is activated on the basis of the transfer function measuring activation signal data. The vibration of the vehicle due to the above activation is detected by the accelerometer 1, being inverted by the inverting amplifier 2, and is integrated by the integrator 3. The output from the integrator 3 is read out by the computer 15 by way of the anti-aliasing filter 13 and the A/D converter 14. On the basis of the signal data thus read out and the transfer function measuring activation signal data, the transfer function is calculated. The calculated transfer function is contained in the measured transfer function data containing area 164.

Subsequently, the measured transfer function data contained in the measured transfer function data containing area 164 and the target data contained in the target data containing area 162 are read out. Activation control data are produced on the basis of both the data, and are contained in the activation control data containing area 166. The activation control data thus contained are read out and are converted into analog signals by the D/A converter 17. The analog signals are smoothed by the smoothing filter 18 and are supplied to the actuator 19. By activation signals on the basis of the activation control data, the automatic four-wheeled vehicle 11 is activated by way of the actuator 19. The output Of the accelerometer 1 due to this activation is integrated by the integrator 3. The output from the integrator 3 is read out by the computer 15 and is contained in the response data containing area 165.

The response data is compared with the target data, and the activation control data is corrected on the basis of the difference between the response data and the target data and the transfer function. The corrected activation control data are contained in the activation control data containing area 166. Next, the activation is performed on the basis of the corrected activation control data, to correct the activation control data. The correction is repeated until the response data corresponds to the target data. The activation control data at the time when the response data corresponds to the target data are contained in the activation control data containing area 166 as the final activation control data.

Subsequently, the activation is performed on the basis of the activation control data contained in the activation control data containing area 166, and the road simulation of the vehicle is performed.

Although there has been described the case having one accelerometer 1, in the case of an automatic four-wheeled vehicle 11, the accelerometers 1 are provided near respective axle shafts. Accordingly, corresponding parts are required for each shaft except for the computer 15, memory 16 and key board 20. However, low and high frequencies of vibration can be detected by a single accelerometer.

The above construction is basically applied to the case of a motorcycle.

Figure 5:
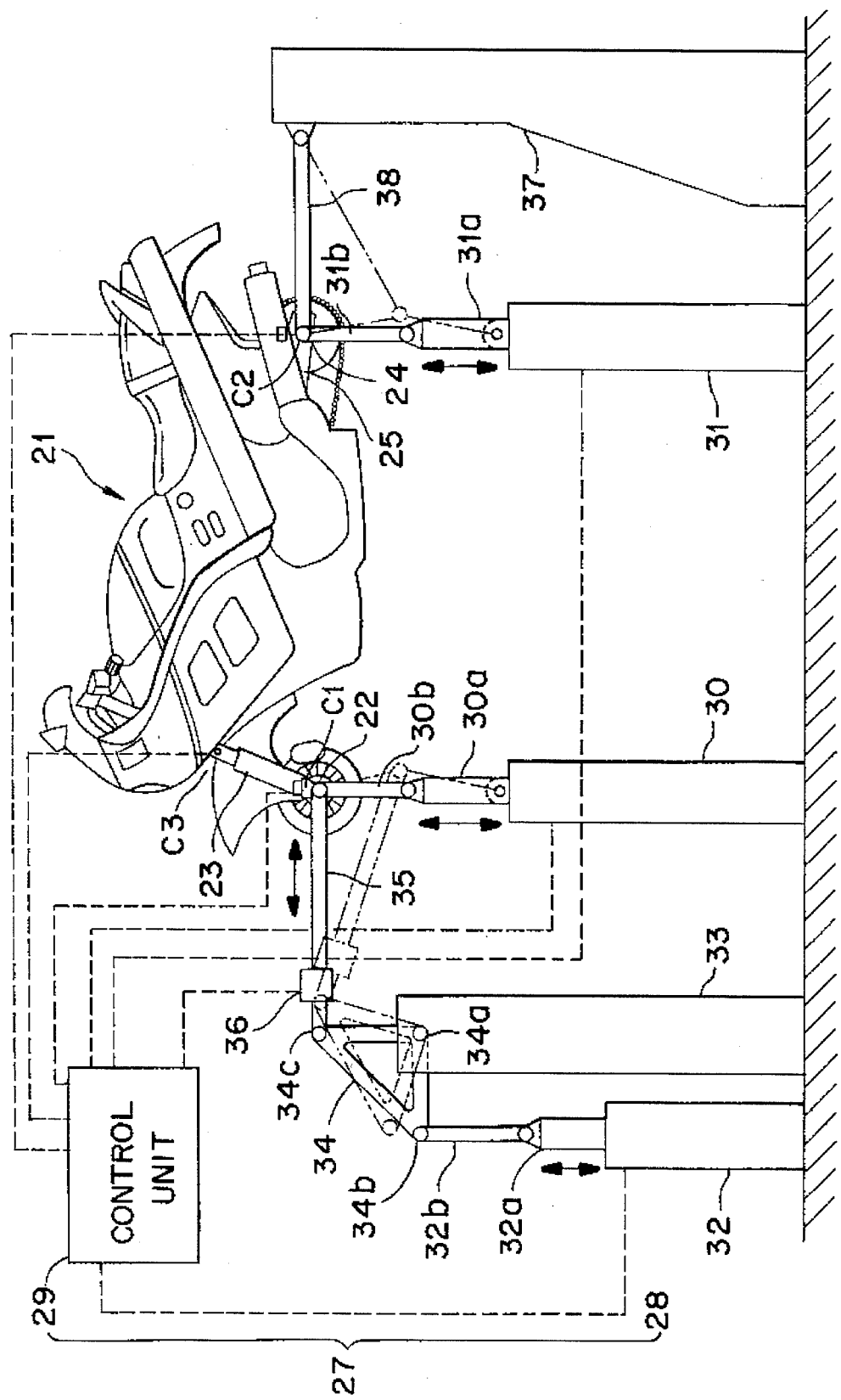
FIG. 5 illustrates a schematic view showing a motorcycle in the road simulation by the vehicle load simulator of the present invention.

FIG. 5 is a schematic view showing the road simulation for a motorcycle. A motorcycle 21 is road-simulated wherein wheels have been previously removed. An axle shaft 22 of a front wheel is rotatably supported by a body frame, which is supported by a telescopic type suspension 23. An axle shaft 24 of a rear wheel is mounted on a rear fork 25 swingingly supported on a rear cushion, not-shown, assembled with a link mechanism.

An activating means 27 for directly activating the axle shafts 22 and 24 of the motorcycle 21 includes an activation drive unit 28 for actually activating the axle shaft 22 and 24 and a control unit 29 for controlling the activation drive unit 28. The control unit 29 is a functioning means within the computer 15 as shown in FIG. 4.

The activation drive unit 28 includes an actuator 30 for vertically activating the axle shaft 22, an actuator 31 for vertically activating the axle shaft 24, and an actuator 32 for activating the axle shaft 22 in the longitudinal direction. Each of the actuators 30, 31 and 32 may be constituted of, for example, a double-acting hydraulic cylinder capable of exerting tensile and compression forces.

One end of connecting rods 30b and 31b is pin-connected to the leading edges of piston rods 30a and 31a of the actuators 30 and 31, respectively. The other ends of the connecting rods 30b and 31b are pin-connected to the axle shaft 22 and the rear fork 25, respectively.

A connecting rod 32b is pin-connected to the leading edge of a piston rod 32a of the actuator 32. One end 34b of a swing plate 34 is pin-connected to the leading edge of the connecting rod 32b. The swing plate 34 is formed in a triangular shape as seen from the side, and a central base end portion 34a is swingingly supported on the upper portion of a support body 33. The other end 34c of the swing plate 34 is pin-connected to one end of an activating rod 35 extending substantially in the horizontal direction, and the other end of the activating rod 35 is pin-connected to the axle shaft 22. Namely, by vertically extending/contracting the piston rod 32a of the actuator 32, the axle shaft 22 is activated in the longitudinal direction by way of the swing plate 34 and the activating rod 35.

A load detecting means 36 is provided on the activating rod 35. In addition, a rigid reaction jig 37 restricts the longitudinal movement of the body of the motorcycle 21. The axle shaft 24 is connected to the reaction jig 37 by way of a link bar 38.

The accelerometers 1, shown by the reference numerals C1 and C2 in FIG. 5, of the vibration detecting device 10 of the present invention are mounted on the suspension 23 and the rear fork 25, respectively. A strain detecting device C3 is stuck on the suspension.

The output from each of the accelerometer C1 and C2 is supplied to the integrator by way of the inverting amplifier to be integrated. It is then converted into digital data by the A/D converter, and is supplied to the control unit 29. The output of each of the strain detecting device C3 and the road detecting device 36 is converted into digital data by the A/D converter, and is supplied to the control unit 29.

Here, each of the actuators 30, 31, and 32 are subjected to displacement control. The displacement control method enables control of high speed and high acceleration as compared with a road control method, and thereby can enhance the accuracy of reproduction of the load applied from a road surface upon actual running.

The longitudinal movement of the axle shaft 24 is restricted by the link bar 38 which is pin-connected to the reaction jig 37. When the actuators 30 and 31 are operated, the left end portion of the link bar 38 depicts a circular-arc locus, and thereby the body is possibly applied with unexpected longitudinal compression or tensile roading. To solve such inconvenience, the following tracer control is performed. As a result, the actuators 30, 31 and 32, while being supported by the reaction jig 37 with a simple structure, enables the control of high speed displacement.

The control unit 29 supplies the command to the actuator 32 such that the value from the load detecting means 36 becomes zero. Next, on the basis of a command from the control unit 29, the actuators 30 and 31 are operated such that the lower ends of the piston rods 30a and 31a are moved at low speed from the lowermost points to the activation neutral points, that is, moved at the speed by means of which the value of the road detecting means 36 is kept at zero by operating the actuator 32 to follow the actuators 30 and 31.

Figure 6:
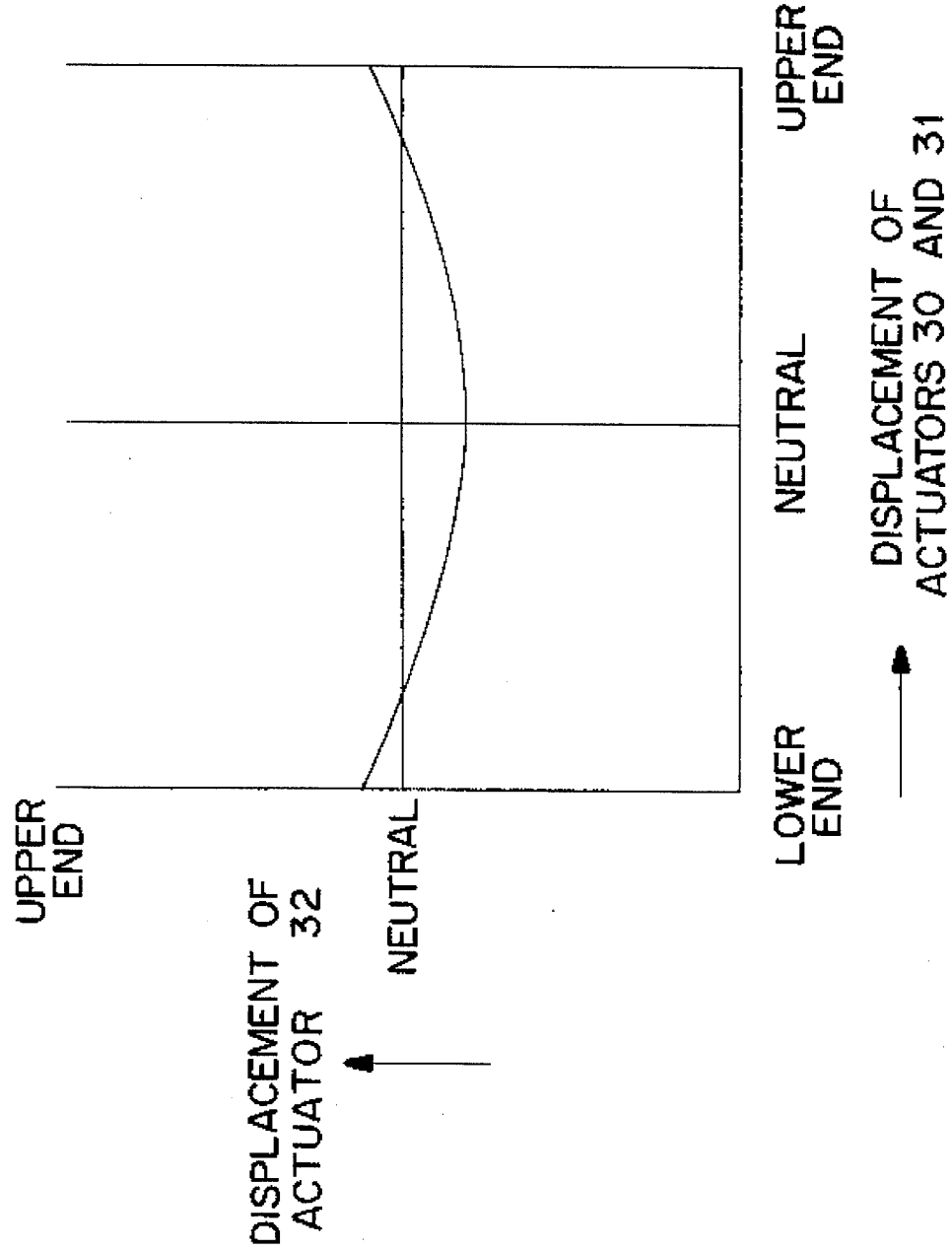
FIG. 6 illustrates a view showing the relationship between actuators of a motorcycle in the road simulation by the vehicle load simulator of the present invention.

The locus of the piston rod 32a of the actuator 32 is converted into digital data, which are contained in the memory 16. FIG. 6 shows the memory map. In this way, the displacement of the actuator 32 in association with the displacements of the actuators 30 and 31 is contained in the memory 16. The actuator 32 is then switched in the control mode into the displacement control along the memory map. The actuators 30 and 31 are operated, and the actuator 32 is operated along the map on the basis of the displacements of the piston rods 30a and 31a until the piston rod 32a reaches the neutral position. After that, the actuator 32 is stopped in its control along the map, and the actuators 30, 31, and 32 are operated on the basis of the activation control data, so that the motorcycle 21 is applied with the actually running road.

In addition, even when the actuators 30, 31 and 32 are stopped, the actuator 32 is stopped while being operated along the above-described map.

The motorcycle 21 is then activated in the same manner as in the case of the automatic four-wheeled vehicle 11 described with reference to FIG. 4. The activation is omitted.

As described above, a vibration detecting device of the present invention includes an accelerometer mounted on a vehicle and an integrator for integrating the output from the accelerometer, wherein the output from the accelerometer is converted into a vibration detecting output by the integrator. Thus, a detected acceleration output is converted into a velocity signal. This makes it possible to easily detect low frequencies of vibration compared with the case using the detected acceleration signal, and to detect a wide range of frequencies of vibration only by one accelerometer.

Moreover, by supplying the detected acceleration output to the inverting input of integrator by way of an inverting amplifier, the polarity of the output from the integrator can be made to correspond to that of the accelerometer.

In the vehicle load simulator using the vibration detecting device of the present invention, the number of velocity detecting devices are reduced and the number of channels for the detected velocity output is reduced. In the case of conversion into digital data, there is no increase in the number of A/D converters, D/A converters for driving an actuator, correcting circuits for correcting the D/A conversion output on the basis of a transfer function, and the like. Moreover, in the case where the correction on the basis of a transfer function is performed by a computer, the load on calculation and the data area are not increased linearly with the number of channels thereby preventing the deterioration of the response of a computer control system, and further the program is prevented from becoming complex. Moreover, by provision of the integrator for integrating the output of the accelerometer the conventional vehicle load simulator can be used as it is.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle load simulator for detecting a vibration of a travelling vehicle during a field test and for reproducing said vibration, said vehicle load simulator comprising:

an acceleraration detecting device, mounted on the vehicle;

an integrator for integrating an output from said acceleration detection device, wherein the output from said acceleramation detection device is converted by said integrator into an output indicative of vibration;

actuator means for oscillating the vehicle to simulate a running condition of said travelling vehicle; and control means for controlling the actuator means in accordance with the integrated output of the acceleration detection device, said control means including memory means for storing the output of the acceleration detecting device during the field test, comparing means for comparing the output stored by said memory means with the output detected when the vehicle was oscillated by said actuator means, and control signal output means for generating and outputting a control signal to said actuator means in accordance with the output of said comparing means.

2. The vehicle load simulator according to claim 1, and further including a first inverting operational amplifier for inverting and amplifying the output from said acceleration detecting device and supplying the inverted output to said integrator.

3. The vehicle load simulator according to claim 2, said integrator including a second inverting operational amplifier, so that the polarity of the output of the integrator corresponds to the polarity of the detected acceleration.

4. The vehicle load simulator according to claim 3, said integrator having a frequency-gain characteristic such that the gain of the integrator equals unity at some frequency within the frequency range of 15–40 Hz.

5. The vehicle load simulator according to claim 4, said integrator having a frequency-gain characteristic such that the gain of the integrator is unity at a frequency of 15.6 Hz.

6. The vehicle load simulator according to claim 3, said acceleration detection device generating an output of 10 V at an acceleration of 50 G.

7. The vehicle load simulator according to claim 2, said integrator having a frequency-gain characteristic such that the gain of the integrator equals unity at some frequency within the frequency range of 15–40 Hz.

8. The vehicle load simulator according to claim 7, said integrator having a frequency-gain characteristic such that the gain of the integrator is unity at a frequency of 15.6 Hz.

9. The vehicle load simulator according to claim 2, said first inverting amplifier having a gain of 1.

* * * * *